No. 791,770. PATENTED JUNE 6, 1905.
W. W. GIDDENS.
PLOW.
APPLICATION FILED DEC. 18, 1903.

2 SHEETS—SHEET 1.

Witnesses
O. M. Simpson
F. C. Jones

Inventor
W. W. Giddens
By
Chandler & Chandler
Attorneys.

No. 791,770. PATENTED JUNE 6, 1905.
W. W. GIDDENS.
PLOW.
APPLICATION FILED DEC. 18, 1903.

2 SHEETS—SHEET 2.

Witnesses
C. M. Simpson
F. C. Jones

Inventor
W. W. Giddens
By
Chandler & Chandler
Attorneys.

No. 791,770.

Patented June 6, 1905.

UNITED STATES PATENT OFFICE.

WILLIAM W. GIDDENS, OF ADEL, GEORGIA.

PLOW.

SPECIFICATION forming part of Letters Patent No. 791,770, dated June 6, 1905.

Application filed December 18, 1903. Serial No. 185,686.

*To all whom it may concern:*

Be it known that I, WILLIAM W. GIDDENS, a citizen of the United States, residing at Adel, in the county of Berrien, State of Georgia, have invented certain new and useful Improvements in Plows; and I do hereby declare the following to be a full, clear, and exact description of the invention, such as will enable others skilled in the art to which it appertains to make and use the same.

This invention relates to improvements in plows, and has for one of its objects to provide a bracket which is adapted for vertical adjustment upon the plow-stock and having means to cut or dig into the ground and guard against a lateral tilting of the plow when in service.

Another object of the invention resides in the provision of a simple, inexpensive, and durable bracket designed for vertical adjustment upon the plow-stock and having an attachment arranged for adjustment to aid in the control of the plow and in the digging of furrows of different depths.

With these and other objects in view, the present invention consists in the combination and arrangement of parts, as will be hereinafter more fully described, illustrated in the accompanying drawings, and particularly pointed out in the appended claim, it being understood that changes in the form, proportion, size, and minor details may be made, within the scope of the claim, without departing from the spirit or sacrificing any of the advantages of the present invention.

Figure 1:
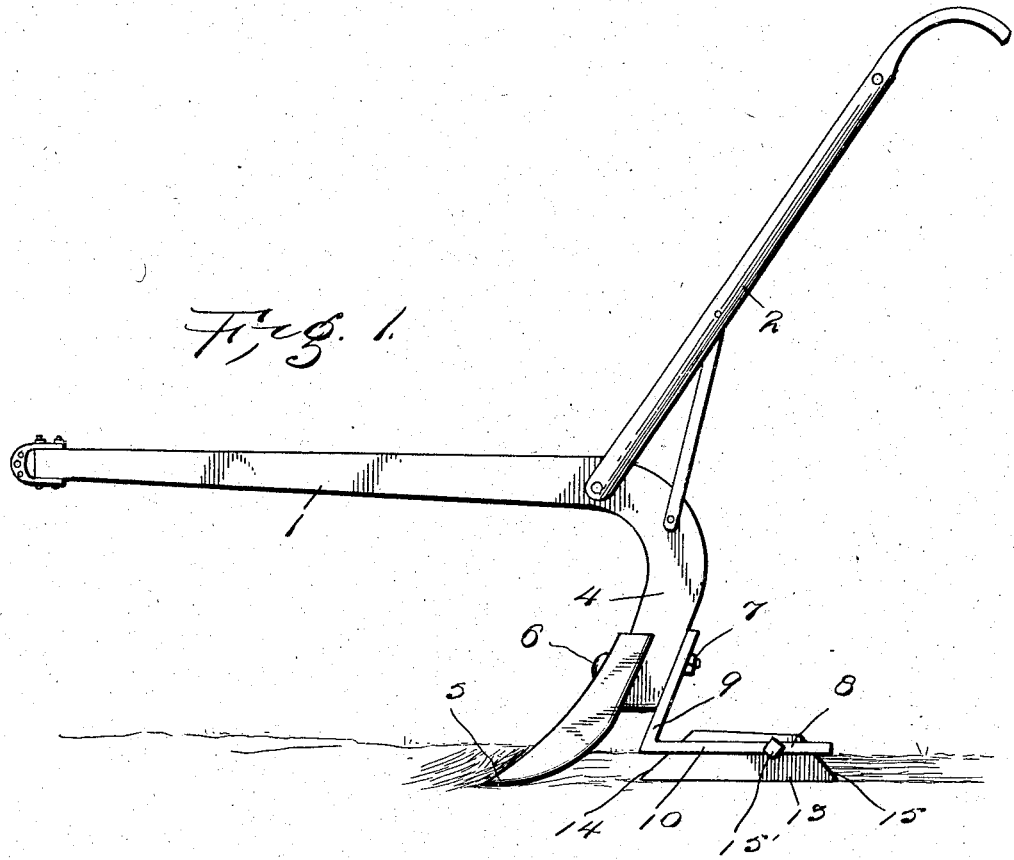
Figure 3:
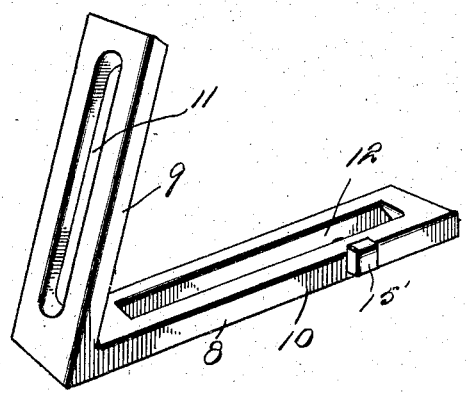
Figure 5:
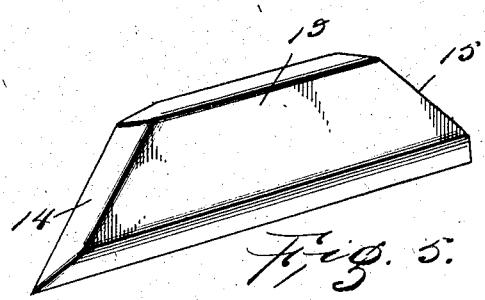
Figure 2:
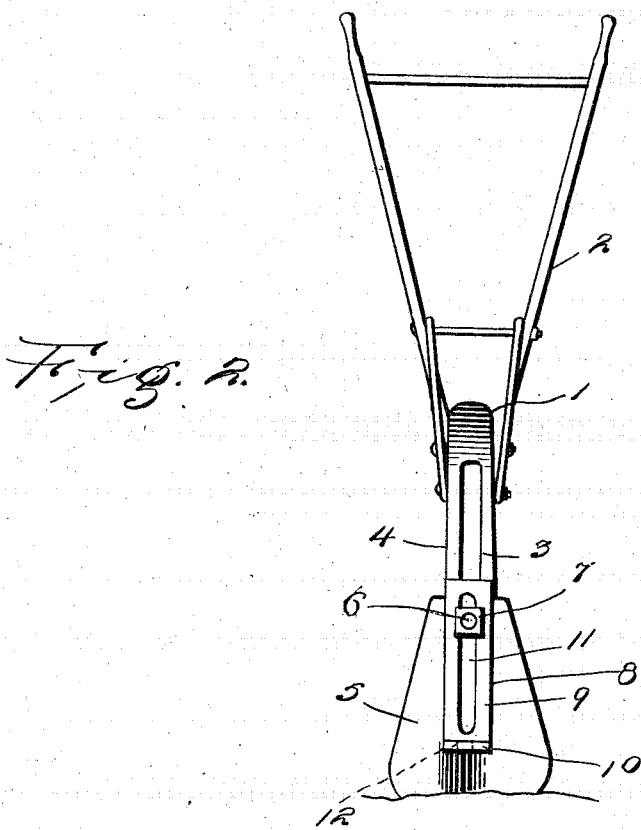
Figure 4:
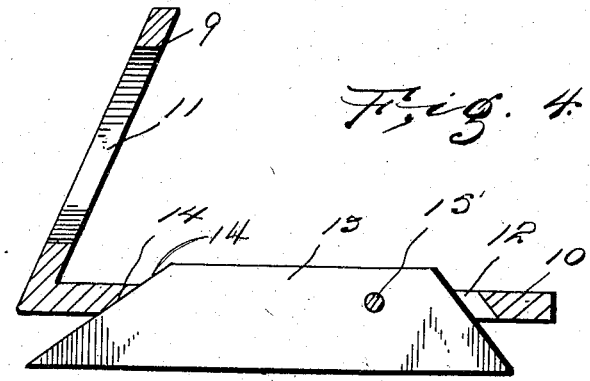

In the drawings, Figure 1 is a side elevation showing a plow equipped with the present invention. Fig. 2 is a rear elevation of the structure shown in Fig. 1. Fig. 3 is a perspective view of the bracket. Fig. 4 is a sectional view of the bracket, the cutting-blade being shown in elevation attached thereto. Fig. 5 is a perspective view of the cutting-blade or a knife.

Referring now more particularly to the drawings, the reference character 1 designates a plow-beam provided with the handles 2, the stock comprising the parallel members 3 and 4, a shovel or plow-point 5 being secured detachably to the front faces of the parallel members of the stock and rendered vertically adjustable thereupon by means of the bolt or other element 6, designed to pierce the shovel or point and protrude between the parallel members of the stock with a nut or other means 7 screwed or otherwise fitted upon the free end thereof.

The bracket 8 comprises an upwardly-directed extension 9 and a horizontal bar or extension 10, both extensions having elongated longitudinal slots 11 and 12, respectively, the slot 11 of the upwardly-directed extension having a working fit upon the bolt or other element 6 and disposed for vertical adjustment upon the rear faces of the stock members, the nut or other means 7 serving to clamp the same in the desired position. Thus it will be seen that the bracket is detachable and vertically adjustable.

A knife-blade 13, whose rear and forward faces or edges 14 and 15, respectively, are inclined, is detachably fitted and mounted within the slot 12 of the horizontal bar or extension 10 by means of the screw or other element 15' and is designed to follow the plow-point or shovel to cut into the ground or into the bottom of the furrow made by the point or shovel, the purpose being to steady or prevent tilting of the bar 10 or the plow as a whole, as well as to cut into the more or less large particles of earth brought up by the plow-point or shovel and pulverize them. The forward end of the slot 12 of the bar or extension 10 is beveled, as indicated by the reference character 14', so that the pointed end 14 of the blade, formed by the sharp forward incline thereof, may fit snugly thereupon and within the slot, thereby offering not the slightest resistance to the forward movement of the plow. There are times—for instance, when the ground is very wet—necessitating the positioning of the blade that it may protrude to a greater extent through its slot. To hold the plate in different positions in the slot, a set-screw 15' is provided, which is engaged through one side of the bar 10, the blade being capable of different inclined adjustments.

It will thus be seen that the cutting-blade will not resist the forward movement of the plow; that the plow-point or shovel is more or less relieved in its cutting or digging capacity; that the bracket is saved much wear and tear; that the blade can be sold as a separate and independent article of manufacture and secured to any bracket simply by forming a slot or passage in the latter; that the draft is relieved of undue strain; that my improved bracket as a whole may be readily applied to the plows now in use; that the same is simple and inexpensive of manufacture.

I claim—

A bracket embodying a rearwardly-directed portion having a longitudinal slot therein, one end of the slot being beveled, and a cutting-blade adjustably mounted in said slot and having its forward edge inclined forming a point fitting normally within the slot upon the inclined portion thereof.

In testimony whereof I affix my signature in presence of two witnesses.

WILLIAM W. GIDDENS.

Witnesses:
J. M. SUTTON,
BEN SUTTON.